(12) United States Patent
Lacy et al.

(10) Patent No.: US 6,418,007 B1
(45) Date of Patent: Jul. 9, 2002

(54) TRIMMABLE CHIP STUB

(75) Inventors: Brian W. Lacy, Marengo; Jerry S. Flondro, Belvidere; Loren F. Root, McHenry; Jeffrey A. Frei, Hawthorn Woods, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/648,779

(22) Filed: Aug. 28, 2000

(51) Int. Cl.⁷ .................................................. H01G 4/00
(52) U.S. Cl. .................. 361/301.1; 361/303; 361/306.3; 361/321.2
(58) Field of Search ................................ 361/301.1, 271, 361/321, 303, 306.3, 312, 321.2, 311, 313, 306

(56) References Cited

U.S. PATENT DOCUMENTS

| | | | | |
|---|---|---|---|---|
| 3,787,961 A | * | 1/1974 | Tomiwa | 29/570 |
| 4,682,269 A | * | 7/1987 | Pitasi | 361/386 |
| 4,734,818 A | * | 3/1988 | Hernandez et al. | 361/306 |
| 4,853,826 A | * | 8/1989 | Hernandez | 361/306 |
| 5,073,840 A | * | 12/1991 | Coors | 361/400 |
| 5,159,524 A | * | 10/1992 | Hasegawa et al. | 361/271 |
| 5,347,423 A | * | 9/1994 | deNuef et al. | 361/313 |
| 5,604,328 A | * | 2/1997 | Kubota et al. | 174/52.1 |
| 5,822,174 A | * | 10/1998 | Yamate et al. | 361/302 |
| 6,115,234 A | * | 9/2000 | Ishii et al. | 361/303 |
| 6,191,932 B1 | * | 2/2001 | Kuroda et al. | 361/303 |
| 6,258,627 B1 | * | 7/2001 | Benenati et al. | 438/108 |

* cited by examiner

Primary Examiner—Chau N. Nguyen
Assistant Examiner—Nguyen T Ha
(74) Attorney, Agent, or Firm—Jeffrey K. Jacobs

(57) ABSTRACT

A non-polarized laser trim chip stub in accordance with the invention includes a trimmable top conductor (12) capable of being trimmed to alter the electrical properties of the chip stub, a bottom conductor (58) having at least a first conductive portion (68) and a second conductive portion (72), a dielectric (44) separating said top conductor from said bottom conductor, and conductive passages (42) electrically connecting the top conductor or a portion thereof to the bottom conductor or a portion thereof. In alternate embodiments, the non-polarized laser trim chip stub's top conductor (102) is separated into a trimmable stub portion (110) and an end portion (112), and the bottom conductor (150) may be separated into three conductive portions (160, 162 and 164) to allow for the middle portion (162) to be used as a heat sink to aid in the dissipation of heat generated during high power applications.

19 Claims, 2 Drawing Sheets

TRIMMABLE CHIP STUB

BACKGROUND OF THE INVENTION

This invention relates generally to electronic components, and more particularly concerns trimmable chip stubs.

The electronics industry is continually called upon to make products smaller and more powerful. Applications such as mobile phones, portable computers, computer accessories, hand-held electronics, etc., create a large demand for smaller electrical components. These applications further drive technology to research new areas and ideas with respect to miniaturizing electronics and using less expensive materials. Unfortunately, the technology is often limited due to the inability to make certain components smaller, more powerful, or less expensive. Nowhere can this be seen more than in the struggle to manufacture small and inexpensive printed circuit board (PCB) components.

Originally, electrical components were mounted on a PCB by inserting the leads of the component through the PCB and soldering them to solder pads on the opposite side of the PCB, (called through-hole technology). This technique left half of the PCB unpopulated because one side had to be reserved for solder pads and solder. Therefore, in order to fit more components in a particular circuit, the PCBs were made larger, or additional PCBs were required. Such configurations required more PCB material and space. All of which, had the effect of increasing costs.

The solution to this problem came in the form of Surface-Mount Devices (SMD), or Surface-Mount Technology. SMDs allow electrical components to be mounted on one side of a PCB, (i.e., without requiring the device leads to be inserted through holes). An SMD device has small solder pads (leads or terminations) connected to its body, which correspond to solder pads or lands placed on the surface of the PCB. Typically the PCB is run through a solder-paste machine (or screen printer), which puts a small amount of solder on the solder pads or lands of the PCB. Next, a glue dot is inserted on the PCB where the component is to rest. Then the component is placed on the PCB (temporarily held by the glue dot), and the PCB is sent through a re-flow oven to heat the solder paste and solder the component leads to the PCB solder pads or lands (thereby electrically connecting the component to the rest of the circuit). The components are generally supplied in a tape and reel carrier and are extracted by a robotic arm or movable chuck having a vacuum nozzle that removes the component from its carrier and places it on the PCB. As such, it is beneficial to have flat components to aid in the vacuum assembly's ability to remove the component from its packaging. In addition, it is favorable to have non-polarized parts so that the component can be placed on the board in any direction, or in whatever direction the reel is set up to feed the component.

The primary advantage to SMD components is that both sides of the PCB can now be populated by electronic components, which means that one PCB today can roughly accommodate the same amount of electrical components which generally required two PCBs in the past. This technology has eliminated a significant amount of cost incurred by manufacturers, and greatly reduced the amount of space needed for electronic circuits.

As a result of this advancement in technology, current electronic circuit costs are mainly dictated by the costs of the individual components used on the PCB, the height requirement of each component, and the amount of time it takes to manufacture the finished product. In other words, if the electronic components are made less expensive, take up less space, and make for a more efficient process of manufacturing, the overall circuit will be less expensive and more compact. Unfortunately, there is a trade-off in making certain electrical components less costly because the desired parameters for the component cannot be achieved when using less expensive materials, or there is an inherent limitation in making the component less costly because it cannot be manufactured using less expensive materials. Trimmable chip stubs (or trimmable chip capacitors) are good examples of this.

Capacitors are circuit elements having two conducting surfaces or plates separated by a nonconducting material, or dielectric. Positive charges are transferred to one plate and negative charges to the other. The charge differential between the conductive surfaces or plates creates an electric field that stores energy. Because of the presence of the nonconducting dielectric, the conduction current that flows in the wires connecting the capacitor to the circuit cannot flow internally between the conductive surfaces or plates. However, due to the presence of electromagnetic fields, a displacement current, which is approximately equal to the conduction current, flows between the plates of the capacitor. Certain parameters of these components are affected by the type of material used to manufacture the component. For instance, the type of material used for the dielectric determines the dielectric constant and cost of the component. As the dielectric constant is increased, the capacitance is increased. For general applications in electronic circuits, the dielectric material may be air, Mylar, polystyrene, mica, glass, ceramics, etc. Typically, ceramics are used because of their high dielectric constant (which allows for large capacitance-to-volume ratios).

In a trimmable chip capacitor, at least one of the conductive surfaces or plates of the capacitor can be trimmed to alter the capacitance of the component, without causing a severe reduction in the quality factor, or Q, of the component. The quality factor is the ratio of the capacitor's reactance to its resistance at a specified frequency. The capacitor plate can be trimmed in several different ways. Prototypes are often trimmed by use of drill or milling machine. However, components that are being mass produced are typically laser trimmed. The advantage to using trimmable chip components is that the component and/or circuit can be tuned to fall within a desired range of operation. For instance, each component has a tolerance within which it is specified to perform. Given the various acceptable values of operation within the tolerance range, and the number of various components used in a circuit, the operation of the circuit as a whole is likely to differ slightly circuit to circuit. By allowing one of the components to be trimmed after completion of the circuit, a specified range of performance for the component and/or the entire circuit can be reached simply by trimming the component until it or the circuit falls within the desired range.

A multi-layer trimmable chip capacitor is disclosed in U.S. Pat. No. 5,264,983, to Petrinec. The component of Petrinec is constructed with spaced apart electrodes embedded in a double layered dielectric body connected to exterior ends on the body. Another electrode in the form of a conductor plate lies on top of the body and is trimmable to alter the capacitance of the component without significantly altering its Q. Petrinec's trimmable chip capacitor is a high loss part that uses a large amount of power, has a low Q, and thus is believed to be incapable of operating properly during high power applications, (i.e., radio frequency/microwave applications). More particularly, Petrinec's trimmable chip capacitor may not be able to handle the high displacement currents associated with high power applications, which would result in the component heating up. Since capacitance and frequency are affected by changes in temperature, the component may not perform within its specified parameters, and in a worst case scenario may heat to temperatures that can damage the circuit and/or break the components electrical connection with the rest of the circuit. Further, the Petrinec component has a fairly complex and highly specialized construction as described above that makes manufacture expensive and time consuming as the components are individually produced via the customized layering process described by Petrinec.

Another problem that has been identified with existing multi-layer tunable chip capacitors is conductor power metalization loss. Multi-layer ceramic capacitors are formed by making a sandwich of conductor coated ceramic layers. Due to their construction and the extremely high temperatures used during the firing process in the fabrication of these multi-layer ceramic capacitors, the conductor metalization can become oxidized thereby increasing the power loss of the component.

A further problem with existing multi-layer tunable chip capacitors is dielectric loss. In the fabrication of multi-layer chip capacitors, different formulations of filling materials (or fillers) are used to make ceramic into a fabrication "tape" for creating the required formation of a multi-layer ceramic dielectric. These fillers have the effect of increasing the loss characteristic of the ceramic material, thereby contributing to the overall power loss of the component.

An additional problem with existing multi-layer tunable chip capacitors is resonance loss. Current multi-layer chip capacitors can have a large amount of parasitic inductance due to the architecture of the component. This parasitic inductance and some conductor metalization and dielectric losses, when combined with the capacitance of the structure, leads to parallel resonance loss over some frequency band of operation. In fact, the current multi-layer capacitor structures will decrease in Q as the component is tuned, as by trimming.

Presently, high power trimmable capacitors are constructed out of ceramic substrates and graphite carriers, and are fabricated directly on the substrate material. The cost of these materials makes the end product more expensive to manufacture and reduces the number of available suppliers. In addition, the necessity to fabricate the component on the substrate material increases costs due to difficulty in manufacturing and increased scrap product. For example, if an error occurs during the trimming of a component fabricated directly on the substrate, the entire circuit must be scrapped, or a costly and time consuming "painting" process must be undertaken in which the component is reconstructed and re-trimmed.

Other attempts have been made to laser tune circuit stubs fabricated on fiberglass PCBs instead of ceramic substrates, however failures have occurred due to the high laser power levels required to remove conductive stub materials. Specifically, the high power levels associated with the laser cause the PCB material to burn or carbonize. As with the use of trimmable capacitive components fabricated on ceramic substrates, once a mistake has been made trimming, the entire board must be scrapped, thereby increasing the cost of production. In addition to causing carbonization, the laser frequently removes more than just the stub conductor material. For example, the laser often cuts through the PCB material, jeopardizing the ability to populate both sides of the PCB and/or risking the accidental severing or damaging of traces on the PCB.

Accordingly, there is a need for an improved trimmable chip stub which is less expensive and is a low loss part capable of operating within defined parameters during high power applications. Further a trimmable chip stub that is capable of being easily and economically replaced if problems occur in tuning the component is desired.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
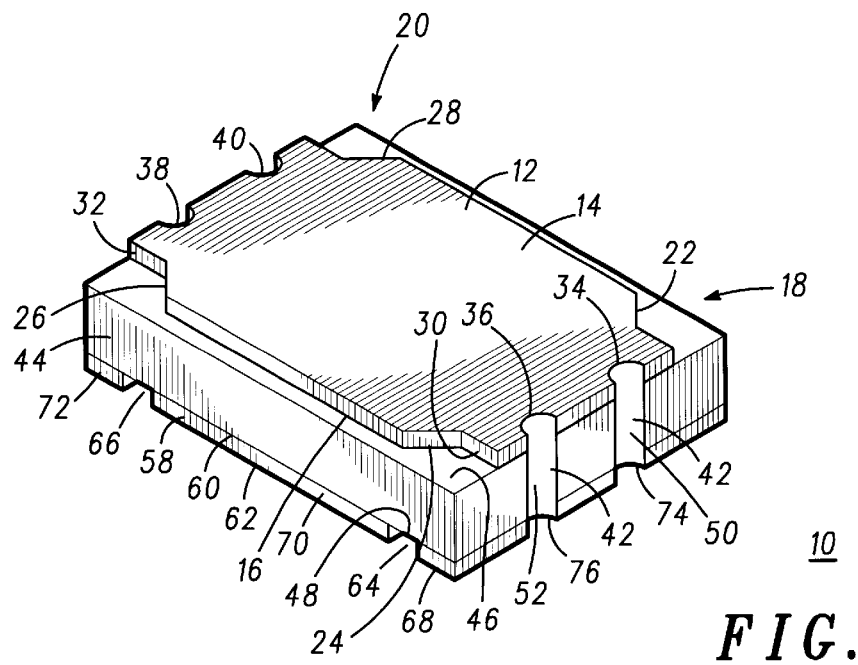
FIG. 1 is a perspective view of a non-polarized trimmable chip stub component according to the invention.

A trimmable chip stub in accordance with the invention is a high Q component capable of operating within its designed parameters while being used in high power applications and/or applications requiring low loss high Q reactive tuning elements such as solid state cellular base station amplifier applications. In addition, the present trimmable chip stub is made out of inexpensive materials and increases the component Q value by reducing the component power loss (e.g., by minimizing such things as conductor metalization loss, dielectric loss, resonance loss, etc.). A trimmable chip stub in accordance with the invention is simple and inexpensive to manufacture, minimizes the manufacturing steps or stages required to produce the end product, and allows for multiple components to be manufactured at a time. Furthermore, the trimmable chip stub herein is preferably supplied in a SMD chip package that can easily and economically be replaced by simply discarding the "chip" and replacing it with another, rather than requiring the entire circuit board to be discarded or undergo a costly and time consuming painting process.

As will be discussed in more detail hereinafter, the non-polarized laser trim chip stub in accordance with the invention includes a top conductor capable of being trimmed into two portions and further trimmed to alter the electrical properties of the chip stub, (e.g., its capacitance), a bottom conductor having at least a first conductive portion and a second conductive portion, a dielectric separating said top conductor from said bottom conductor, and conductive passages electrically connecting the top conductor to the bottom conductor. The dielectric is of an insulating material such as ceramic and serves to separate the top conductor from the bottom conductor. More particularly, the dielectric insulating material is preferably formed as a single layer which provides several advantages over prior multi-layer construction in terms of minimizing the power loss of the component by reducing the risk of metalization loss, dielectric loss and resonance loss, as will be discussed further below. The single layer dielectric is an integral or uniform layer of dielectric that differs from the earlier mentioned capacitor dielectrics in that the integral layer does not have to be formed from multiple layers of dielectric or laminates of dielectric, such as to accommodate electrodes extending through the dielectric.

The top conductor has a smooth planar surface and preferably has tapered ends located opposite each other. The bottom conductor has a smooth planer surface that preferably is generally rectangular in shape and is separated into at least two conductive portions. In the preferred and illustrated form, indentations are located on the ends of the top conductor, the dielectric and the bottom conductor, and are coated with a conductive material such as silver or copper thereby electrically connecting the top conductor to the bottom conductor. The above-described trimmable chip stub architecture allows for multiple components to be manufactured at a time and minimizes the steps or stages required to produce the end product. More particularly, the single layer ceramic construction eliminates the additional steps required to create a sandwich of conductor coated ceramic layers for the multi-layer ceramic capacitors. As such, the additional costs associated with these steps and the added material required can be saved. In addition, because of the planar nature of the top and bottom conductors, the lack of embedded electrodes or the like and multi-layered dielectrics as with the previously described multi-layer capacitor, the construction of the present chip stub lends itself to efficient mass production as the top and bottom of a large, unitary dielectric board can be coated or plated with conductor metal and then formed into the individual capacitors herein. In this manner, large arrays of trimmable chip stubs can be provided increasing the number of components produced at a time and reducing the costs associated with additional manufacturing time. Further, the indentations can be formed as half vias from cylindrical through holes in the board. The board can then be separated or cut at the center line of the holes, leaving indentations on either side of the cut board.

The non-polarized laser trim chip stub becomes polarized when its top conductor is separated into a stub portion and an end portion. The stub portion is connected to one of the conductive portions of the bottom conductor via the conductive passages, and is capable of being trimmed to alter the electrical properties of the capacitor. The end portion of the top conductor is connected to the other conductive portion of the bottom conductor via conductive passages. When placed on a PCB, the conductive portion associated with the stub portion is connected to a microstrip signal line, and the conductive portion associated with the top conductor end portion is connected to ground. If the bottom conductor is separated into three conductive portions, the middle conductive portion and the conductive portion associated with the top conductor end portion are both connected to ground. In such a configuration, the middle conductive portion and the conductive portion associated with the top conductor end portion may also be connected to a heat sink to help dissipate heat generated in high power applications.

Figure 2:
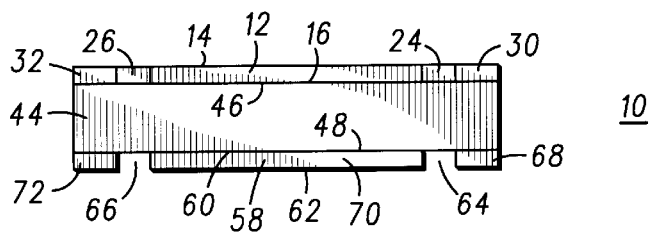
FIG. 2 is an elevation view of the component shown in FIG. 1.

Turning first to FIGS. 1 and 2, a trimmable chip stub in accordance with the invention for mounting on a printed circuit board or PCB 302 (FIG. 7) is shown generally designated with reference numeral 10. For convenience, the trimmable chip stub 10 is described as it would be positioned on the surface of the PCB 302.

In FIGS. 1 and 2, the trimmable chip stub 10 includes a top conductor 12 made of a trimmable conductive material, such as silver or copper. The top conductor 12 has a polygonal shape, and is defined by a smooth planer top 14 and a bottom 16. Opposite ends 18 and 20 are tapered, having taper walls 22, 24, 26 and 28, and struck out members 30 and 32. As is depicted in FIGS. 1 and 2, struck out members 30 and 32 include half-rounds or indentations 34, 36, 38 and 40 that are generally semi-circular in shape and are coated with a conductive material 42 such as copper or silver. The smooth planer top 14 aids in the ability to place the component on PCBs rapidly and with pick-and-place equipment that is widely used throughout the industry.

Trimmable chip stub 10 also includes an insulating material or dielectric 44 at least partially connected to the bottom 16 of top conductor 12 and is generally rectangular in shape. The dielectric is preferably made of ceramic or a composite thereof, such as alumina or alumina oxide, and is defined by a smooth planer top 46 and a bottom 48. Half-rounds or indentations 50, 52, 54 and 56 are located at opposite ends of dielectric 44, and are generally semi-circular in shape. Indentations 50–56 correspond with indentations 34–40 of top conductor 12, and are coated with a conductive material 42 such as copper or silver.

The trimmable chip stub 10 further includes a bottom conductor 58, which is at least partially connected to the bottom 48 of dielectric 44, and is made of a conductive material such as copper or silver. The bottom conductor 58 has a generally rectangular shape, and is defined by a smooth planer top 60 and a bottom 62. Recesses 64 and 66 separate the bottom conductor 58 into three conductive portions 68, 70 and 72. The conductive portions 68 and 72 (located opposite each other), are generally rectangular in shape and have half-rounds or indentations 74, 76, 78 and 80 corresponding to indentations 50–56 and 34–40. Indentations 74–80 are generally semi-circular in shape, and are coated with a conductive material 42 such as copper or silver. In an alternate embodiment, the bottom conductor 58 need only have one recess separating the bottom conductor into two conductive portions.

The conductive coating 42 connects all of the indentations 34–40, 50–56 and 74–80, thereby creating conductive passages that connect top conductor 12 to conductive portions 68 and 72. The trimmable chip stub 10 can be shipped in standard reel and tape carriers and can be placed on a PCB with any standard SMD placing equipment, (i.e., any pick-and-place machine). Due to the configuration of the trimmable chip component 10, (i.e., its symmetrical configuration), the component 10 is non-polarized. This allows the component to be placed onto the board in either orientation or direction (as long as the bottom conductor is placed on the bottom and conductive portions 68 and 72 are lined-up with the solder pads or lands on the PCB). Conductive portion 70 will be electrically connected to one of the other conductive portions 68 or 72, and to ground (or a grounding plane). Conductive portion 70 may also be connected to a heat sink via solder in order to assist in the dissipation of heat. Once on the board (and preferably after passing through the re-flow oven) the trimmable chip stub 10 can be delivered to a trimming station for final tuning of the component 10 itself, or final tuning of the electronic circuit in general. The trimming can be performed by a drill/milling machine or a radiant energy source (e.g., a laser). During the trimming process, an initial trim will separate the top conductor 12 into a stub portion and an end portion. More particularly, the component will be trimmed so that the stub portion and its associated bottom conductor portion are connected to a microstrip signal line. The end portion and its associated bottom conductor portion, as well as the center bottom portion (if present), will be connected to ground. The component 10 can then be further trimmed to reduce the size of the stub portion, thereby reducing the capacitance of the component until the desired parameters are reached. The size and construction of the chip stub will produce a high Q low loss circuit element capable of handling the high displacement currents associated with solid state radio frequency and/or microwave amplifying circuits.

Figure 3:
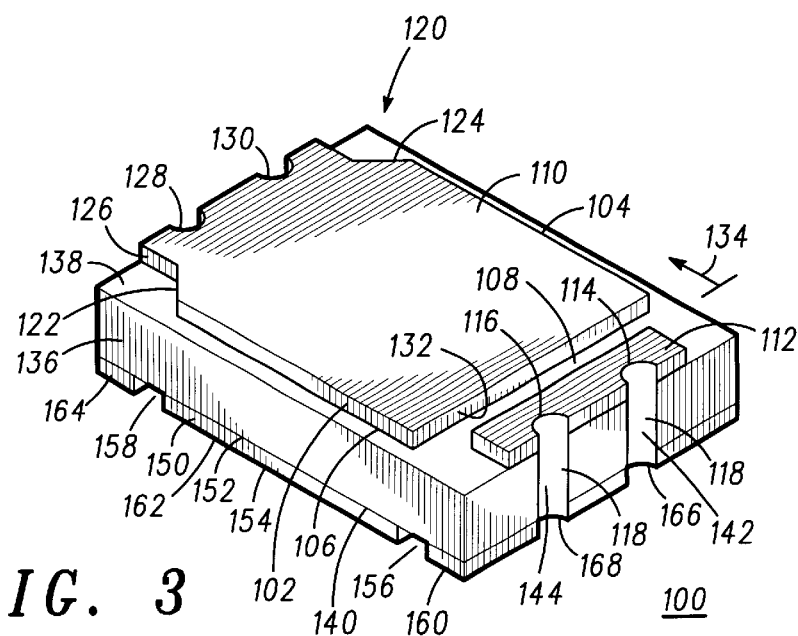
FIG. 3 is a perspective view of the chip stub of FIGS. 1 and 2 trimmed so that it is polarized.
Figure 4:
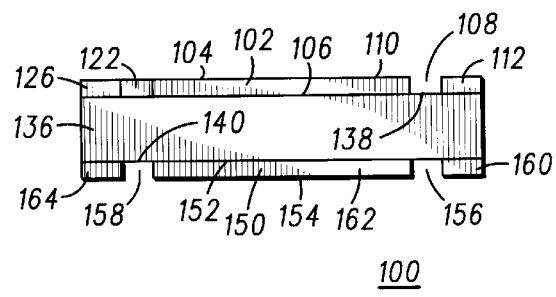
FIG. 4 is an elevation view of the polarized component shown in FIG. 3.

Turning now to FIGS. 3 and 4, a polarized trimmable chip stub in accordance with the invention is shown generally at reference numeral 100. The trimmable chip stub 100 includes a top conductor 102 made of a trimmable conductive material, such as silver or copper. The top conductor 102 has a polygonal shape, and is defined by a smooth planer top 104 and a bottom 106. Recess 108 separates the top conductor 102 into a stub portion 110 and an end portion 112. End portion 112 is generally rectangular in shape with two indentations 114 and 116 located on the side opposite recess 108. Indentations 114 and 116 are generally semi-circular in shape and are coated with a conductive material 118 such as copper or silver. The stub portion 110 is generally rectangular in shape with a tapered end 120 having taper walls 122 and 124, and struck out member 126 that is generally rectangular in shape and similar in size to that of end portion 112. Struck out member 126 has two indentations 128 and 130 (located on the side opposite recess 108) that are generally semi-circular in shape and are coated with a conductive material 118 such as copper or silver. The side of stub portion 110 adjacent recess 108 is trimmable portion 132. Arrow 134 indicates one possible direction trimmable portion 132 can be trimmed in order to alter the capacitance of trimmable chip stub 100.

Trimmable chip stub 100 also includes an insulating material or dielectric 136 at least partially connected to bottom 106 of top conductor 102 and is generally rectangular in shape. The dielectric 136 is preferably made of ceramic or a composite thereof, such as alumina or alumina oxide, and is defined by a smooth planer top 138 and a bottom 140. Indentations 142, 144, 146 and 148 are located at opposite ends of dielectric 136, and are generally semi-circular in shape. Indentations 142–148 correspond with indentations 114–116 and 128–130 of top conductor 102, and are coated with a conductive material 118 such as copper or silver.

The trimmable chip stub 100 further comprises a bottom conductor 150, which is at least partially connected to the bottom 140 of dielectric 136, and is made of a conductive material such as silver or copper. The bottom conductor 150 has a generally rectangular shape, and is defined by a smooth planer top 152 and a bottom 154. Recesses 156 and 158 separate the bottom conductor 150 into three conductive portions 160, 162 and 164. The conductive portions 160 and 164 (located opposite each other), are generally rectangular in shape and have indentations 166, 168, 170 and 172 corresponding to indentations 114–116, 128–130, and 142–148. Indentations 166, 168, 170 and 172 are generally semi-circular in shape, and are coated with a conductive material 118 such as silver or copper. The bottom conductor 140 is preferably separated into three conductive portions 160, 162 and 164, with the central conductive portion 162 and portion 160 connected to ground. If the component is used in a circuit generating a large amount of heat, portions 162 and 160 can also be connected to a heat sink to assist in dissipating some of the heat. However, in an alternate embodiment, the bottom conductor 150 need only have one recess separating the bottom conductor into two conductive portions. In such an embodiment, recess 156 would not be present and conductive potions 160 and 162 would be combined.

The conductive coating 118 connects all of the indentations 114, 116, 128, 130, 142, 148, 166 and 172, thereby creating conductive passages that connect top conductor 102 to conductive portions 160 and 164. More specifically, the conductive passages connect end portion 112 to conductive portion 160 and stub portion 110 to conductive portion 164. When placed on a PCB, the end portion 112 and conductive portions 160 and 162 would be connected to a grounding plane. The stub portion 110 and conductive portion 164 would be connected to a microstrip signal line. If bottom conductor 150 is divided into only two conductive portions the combined portions 160 and 162 and end portion 112 would be connected to ground, and conductive portion 164 and stub portion 110 would be connected to the microstrip signal line. The trimmable chip stub 100 can be shipped in standard reel and tape carriers and can be placed on a PCB with standard SMD placing equipment, (i.e., pick-and-place machine).

Once on the PCB (and preferably after passing through the re-flow oven) the trimmable chip stub 10 can be delivered to a trimming station for final tuning of the component 100 itself, or final tuning of the electronic circuit in general. The trimming can be performed by a drill/milling machine or a radiant energy source (e.g., a laser). During the trimming process, the component 10 can then be trimmed (further increasing the size of recess 108) to reduce the size of the stub portion, thereby reducing the capacitance of the component.

Figure 5:
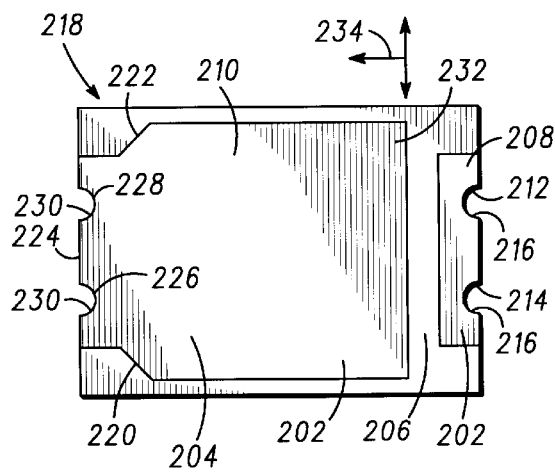
FIG. 5 is a plan view of the component shown in FIGS. 3 and 4.

In FIG. 5, a plan view of the trimmable chip stub shown in FIGS. 3 and 4 is shown generally at reference numeral 200. The component 200 includes a top conductor 202 made of a trimmable conductive material, such as silver or copper. (Silver is preferable due to the ease with which it can be trimmed). The top conductor 202 has a polygonal shape and is defined by a smooth planer top 204. Recess 206 divides the top conductor into an end portion 208 and a stub portion 210. End portion 208 is generally rectangular in shape with two indentations 212 and 214 located on the side opposite recess 206. Indentations 212 and 214 are generally semi-circular in shape and are coated with a conductive material 216, such as copper or silver. The stub portion 210 is generally rectangular in shape with a tapered end 218 having taper walls 220 and 222, and struck out member 224 that is generally rectangular in shape and similar in size to that of end portion 208. Struck out member 224 has two indentations 226 and 228 (located on the side opposite recess 206) that are generally semi-circular in shape and are coated with a conductive material 230 such as copper or silver. The side of stub portion 210 adjacent recess 206 is trimmable portion 232. Arrows 234 indicate one possible way trimmable portion 232 can be trimmed in order to alter the capacitance of the trimmable chip stub 200.

Figure 6:
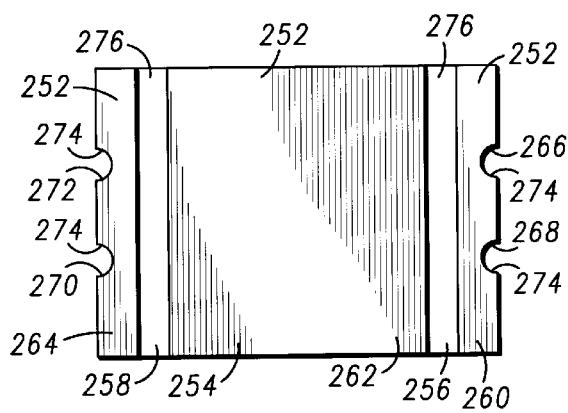
FIG. 6 is a bottom plan view of the trimmable chip stub.

FIG. 6 is a bottom view of the trimmable chip stubs shown in FIGS. 1 and 3. In this figure, the trimmable component is shown generally at reference numeral 250 and has a bottom conductor 252 that is made of a conductive material such as copper or silver. The bottom conductor 252 has a generally rectangular shape and is defined by a smooth planer bottom surface 254. Recesses 256 and 258 separate bottom conductor 252 into three conductive portions 260, 262 and 264. The conductive portions 260 and 264 (located opposite each other), are generally rectangular in shape and have indentations 266, 268, 270 and 272. Indentations 266, 268, 270 and 272 are generally semi-circular in shape and are coated with a conductive material 274, such as copper or silver. In an alternate embodiment, the bottom conductor 202 need only have one recess separating the bottom conductor into two conductive portions.

Figure 7:
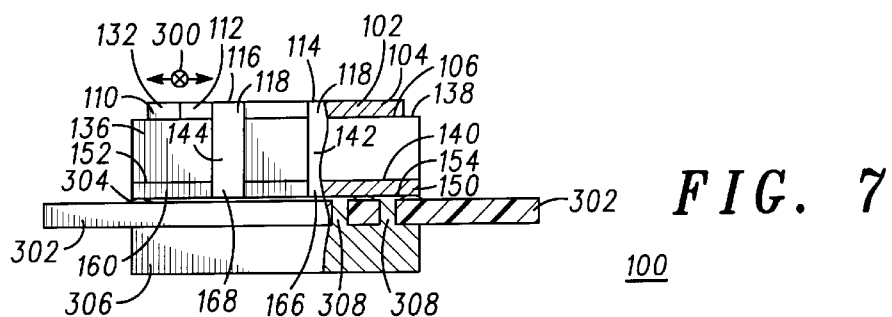
FIG. 7 is an elevation view, partially in cross section, of the trimmable chip stub mounted on a printed circuit board.

FIG. 7 is an elevation view of the trimmable chip stubs shown in FIG. 3. In this figure, the trimmable chip stub is shown generally at reference numeral 100 as it would appear mounted on a PCB, and is partially in cross section. The component 100 includes a top conductor 102 made of a trimmable conductive material, such as silver or copper. The top conductor 102 has a polygonal shape, and is defined by a smooth planer top 104 and a bottom 106. Recess 108 separates the top conductor 102 into a stub portion 110 and an end portion 112. (In FIG. 7, recess 108 is located behind end portion 112 and in front of stub portion 110). End portion 112 is generally rectangular in shape with two indentations 114 and 116 located on the side opposite recess 108. Indentations 114 and 116 are generally semi-circular in shape and are coated with a conductive material 118 such as silver or copper. The stub portion 110 is generally rectangular in shape with a tapered end. (See FIG. 3). The side of stub portion 110 adjacent recess 108 is trimmable portion 132. Arrows 300 indicate possible ways trimmable portion 132 can be trimmed in order to alter the capacitance of trimmable chip stub 100.

Trimmable chip stub 100 also comprises an insulating material or dielectric 136 at least partially connected to bottom 106 of top conductor 102 and is generally rectangular in shape. The dielectric 136 is preferably made of ceramic or a composite thereof, such as alumina or alumina oxide, and is defined by a smooth planer top 138 and a bottom 140. Indentations 142 and 144 are generally semi-circular in shape. Indentations 142 and 144 correspond with indentations 114 and 116 of top conductor 102, and are coated with conductive material 118.

The trimmable chip stub 100 further comprises a bottom conductor 150, which is at least partially connected to bottom 140 of dielectric 136, and is made of a conductive material such as silver or copper. The bottom conductor 150 has a generally rectangular shape, and is defined by a smooth planer top 152 and bottom 154. Recesses 156 and 158 (FIG. 3) divide bottom conductor 150 up into three conductive portions 160, 162 and 164 (FIG. 3). The conductive portion 160 (located nearest end portion 112) is generally rectangular in shape and has indentations 166 and 168 corresponding to indentations 114, 116, 142 and 144. Indentations 166 and 168 are generally semi-circular in shape and are coated with conductive material 118.

The conductive coating 118 connects all of the indentations 114, 116, 142, 144, 166 and 168, thereby creating conductive passages that connect top conductor 102 to conductive portion 160. More specifically, the conductive passages connect end portion 112 to conductive portion 166. As depicted in FIG. 7, bottom conductor 150 is connected to a PCB 302 via solder 304. This is usually accomplished by sending PCB 302 through a screen printer (not shown) where solder 304 is printed onto solder pads or lands located on the PCB 302. Then, the trimmable chip stub 100 (typically along with many other components) is placed on the PCB 302. Usually a glue dot is inserted to temporarily hold the component 100 once it has been placed on the PCB 302. The PCB is next sent through a re-flow oven to heat the solder 304 causing the component 100 to be electrically and mechanically connected to the solder pads or lands of the circuit. At this point, the entire circuit (components and PCB) can be transmitted to a trimming station where portions of the top conductor 102 are removed to alter the capacitance of the component 100 (beginning with trimmable portion 132).

As shown in FIG. 7, bottom conductor 150 may be connected to a heat sink 306 through vias 308 located in the PCB 302. Vias 308 are generally circular in shape and can be located throughout PCB 302. In this preferred embodiment, conductive portion 160 and central conductive portion 162 of bottom conductor 150 (defined by recess 156 and 158) are connected to grounded heat sink 306 through vias 308.

The open circuit microstrip chip stub architecture of the present chip stub 10 achieves a higher component Q value by reducing the amount of component power loss. For example, the conductor power metalization loss is reduced because the metalization can be affixed to a single layer ceramic in ways which result in less conductor loss, such as thin film deposition, sputtering, and glass based thick films with only one adhesion side affixed to the ceramic and possibly followed by additional layers of solid plated metals. On the other hand, in the fabrication of multi-layer ceramic capacitors, the metalization of the sandwich of conductor coated ceramic layers can oxidize during the firing process and increase the power loss of the conductive material. In addition, the microstrip transmission line structure of the chip stub reduces its conductor loss as it is trimmed (i.e., since the transmission line is successively shortened), whereas the conductor loss of the multi-layer ceramic capacitor remains constant.

The power loss of the trimmable chip stub is also reduced by minimizing the dielectric loss of the component. Specifically, the dielectric loss can be reduced because the single layer chip stub can be made of a very pure single layer low loss material like alumina oxide. By contrast, in the fabrication of multi-layer chip capacitors, different formulations of filling materials are used and have the effect of increasing the loss characteristic of the ceramic material.

Another way the component power loss is reduced is by minimizing the resonance loss. The pure microstrip transmission line structure of the chip stub, (which is some length less than an eighth-wave), has no parallel loss mechanism. Whereas the architecture of multi-layer capacitors using multi-layer ceramic has a large amount of parasitic inductance that, in combination with conductor/dielectric losses and the capacitance of the component leads to parallel resonance loss over some frequency band of operation. This results in the decrease in Q as the multi-layer capacitor is tuned.

The trimmable chip stubs according to the invention enable open stub reactive laser tuning of radio frequency/microwave products fabricated on single and multi-layer soft substrate printed circuit board materials to now be feasible with a high Q component. Specifically, the problems of carbonization shorting of soft substrate printed circuit board materials and the cutting of buried layers in multi-layer structures have been avoided.

For both ceramic products which already rely on integral board open stub tunning and soft substrate products which can now use it, tunable chip stubs according to the invention offer a quick, easy, and cost effective design alternative for board repair when the stubs have been incorrectly tuned. Specifically, the trimmable/tunable chip stub eliminates the need to either discard the entire board or undertake the costly and time consuming silver painting, curing, and re-tuning process.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A trimmable chip stub capable of operating in high power applications, the trimmable chip stub comprising:
   a top conductor for being trimmed to alter the electrical properties of the chip stub;
   a bottom conductor having at least a first conductive portion for being connected to a signal line, and a second conductive portion for being connected to ground;
   a dielectric body separating the top conductor from the bottom conductor, wherein the dielectric body comprises a single layer of dielectric material that is substantially uniform and substantially pure to minimize dielectric losses;
   a first conductive passage electrically connecting a portion of the top conductor to one of said bottom conductor portions; and
   a second conductive passage electrically connecting another portion of the top conductor to the other of said bottom conductor portions.

2. The chip stub of claim 1, wherein the dielectric body has a substantially uniform, single layer construction, and the top and bottom conductors are attached on opposite top and bottom surfaces of the single layer body for minimizing conductor and dielectric losses.

3. The chip stub of claim 1, wherein the top and bottom conductors have planar outer surfaces to allow multiple chip stubs to be formed in an attached array.

4. The chip stub of claim 1, wherein the bottom conductor includes a third conductive portion located between said first and second conductive portions and further capable of being electrically connected to one of said first and second conductive portions.

5. The chip stub of claim 4, wherein the chip stub is connected to a PCB, and said third conductive portion is connected to a grounded heat sink.

6. The chip stub of claim 5, wherein the chip stub is disposed on one side of the PCB and the heat sink is on the opposite side of the PCB, and the third conductive portion is electrically connected to the heat sink by way of vias in the PCB.

7. The chip stub of claim 1, wherein the chip stub is non-polarized.

8. The chip stub of claim 1, wherein the dielectric comprises substantially pure alumina to minimize dielectric losses.

9. A trimmable chip stub for operating in high power applications, the trimmable chip stub comprising:
   a top conductor having a stub portion, an end portion and a recess separating the stub portion and the end portion, the stub portion being trimmable to change the size of the recess for altering the electrical properties of the chip stub;
   a bottom conductor having at least a first conductive portion and a second conductive portion, wherein the first conductive portion is capable of being connected to a signal line, and the second conductive portion is capable of being connected to ground;
   a dielectric separating the top conductor from the bottom conductor, wherein the dielectric comprises a single layer of dielectric material that is substantially uniform and substantially pure to minimize dielectric losses;
   a first conductive passage electrically connecting the stub portion to the first conductive portion; and
   a second conductive passage electrically connecting the end portion of the top conductor to the second conductive portion.

10. The chip stub of claim 9, wherein the bottom conductor includes a third conductive portion located between the first and second conductive portions for being electrically connected to one of the first and second conductive portions.

11. The chip stub of claim 9, wherein the chip stub is connected to a PCB, and the third conductive portion is connected to a grounded heat sink.

12. The chip stub of claim 9, wherein the chip stub is disposed on one side of the PCB and the heat sink is on the opposite side of the PCB, and the third conductive portion is electrically connected to the heat sink by way of vias in the PCB.

13. The chip stub of claim 9, wherein the chip stub is non-polarized.

14. The chip stub of claim 9, wherein the dielectric is ceramic alumina.

15. A capacitive component for being placed on a circuit board for use in high power applications, the component comprising:
   a body of dielectric material having top and bottom surfaces with the dielectric material extending substantially uniformly therebetween, wherein the body comprises a single layer of dielectric material that is substantially pure to minimize dielectric losses; and
   a conductor affixed to at least one of the top and bottom surfaces of the body to minimize component power losses associated with oxidation of the conductor so that heat generation is controlled for proper component operation during high power applications.

16. A component according to claim 15, wherein the conductor comprises:
   a top conductor for being trimmed to alter the electrical properties of the component; and
   a bottom conductor having at least a first conductive portion for being connected to a signal line, and a second conductive portion for being connected to ground.

17. A component according to claim 16, wherein the top conductor comprises a stub portion, an end portion, and a recess separating the stub portion and the end portion, the stub portion being trimmable to change the size of the recess for altering the electrical properties of the chip stub.

18. A component according to claim 17, wherein the stub portion is electrically connected to the first conductive portion of the bottom conductor, and the end portion is electrically connected to the second conductive portion of the bottom conductor.

19. A trimmable chip stub capable of operating in high power applications, the trimmable chip stub comprising:
   a top conductor for being trimmed to alter the electrical properties of the chip stub;
   a bottom conductor having at least a first conductive portion for being connected to a signal line, and a second conductive portion for being connected to ground;
   a dielectric body separating the top conductor from the bottom conductor, wherein the dielectric body comprises a single layer of dielectric material that is substantially uniform and substantially pure to minimize dielectric losses;
   a first conductive passage electrically connecting a portion of the top conductor to one of said bottom conductor portions; and a second conductive passage electrically connecting another portion of the top conductor to the other of said bottom conductor portions, wherein the first conductive passage and the second conductive passage result from the creation of a recess, the size of which determines a capacitance of the trimmable chip stub.

* * * * *